W. A. GEIGER.
REVERSIBLY OPERABLE HAND BRAKE.
APPLICATION FILED JULY 12, 1920.
1,391,052.
Patented Sept. 20, 1921.
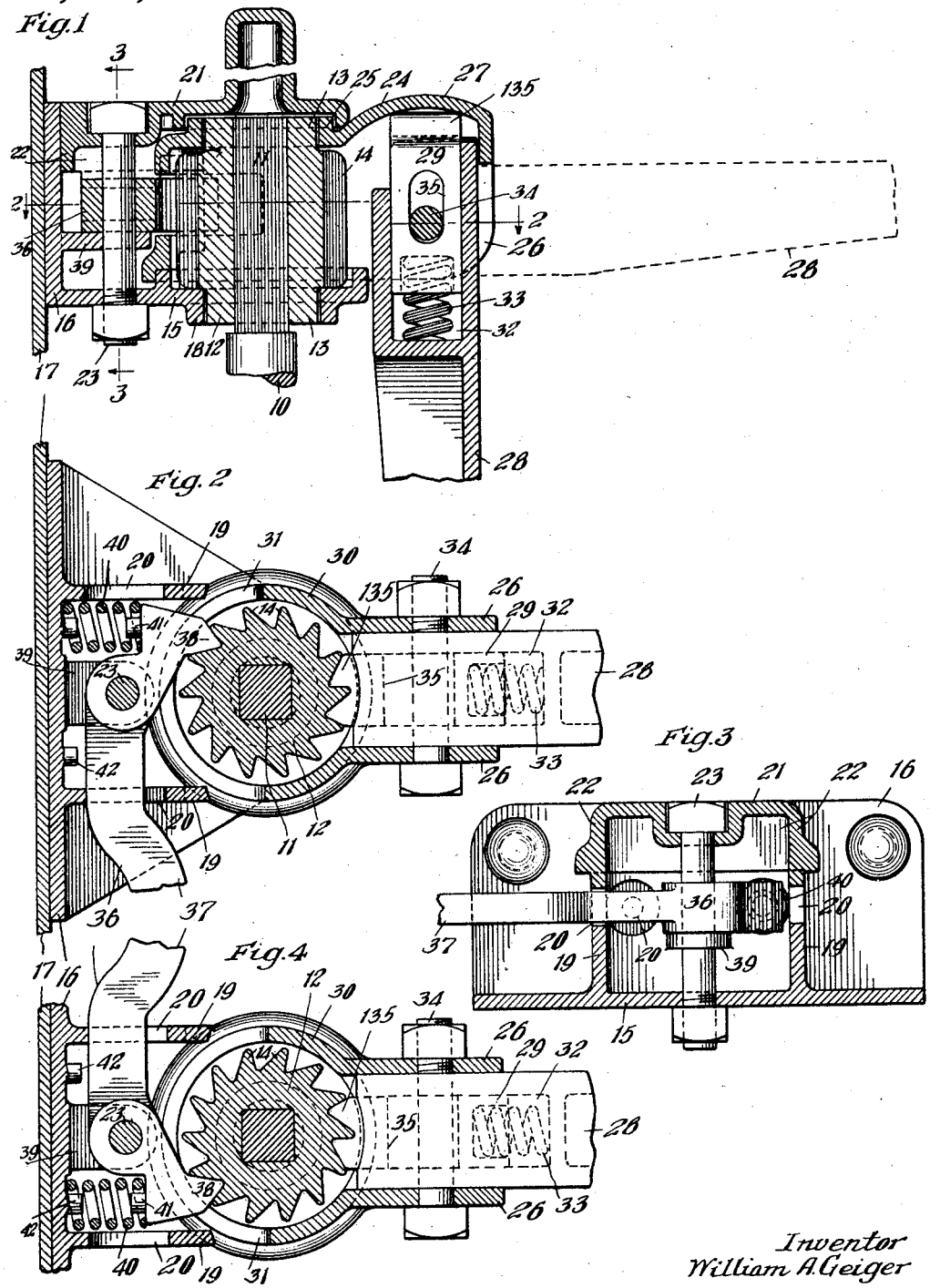
Witnesses
F. B. Townsend
Inventor
William A. Geiger
By Geo. D. Haight
His Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

REVERSIBLY-OPERABLE HAND-BRAKE.

1,391,052.  Specification of Letters Patent.  Patented Sept. 20, 1921.

Application filed July 12, 1920. Serial No. 395,429.

*To all whom it may concern:*

Be it known that I, WILLIAM A. GEIGER, a citizen of the United States, residing at Chicago, in the county of Cook and State of Illinois, have invented a certain new and useful Improvement in Reversibly-Operable Hand-Brakes, of which the following is a full, clear, concise, and exact description, reference being had to the accompanying drawings, forming a part of this specification.

This invention relates to improvements in reversibly operable hand brakes.

In the operation of railway cars, it frequently happens that the hand brakes must be so located as to call for what is known as a "lefthand" operation as distinguished from the usual so-called "righthand" operation. Obviously, additional expense would be incurred both by the manufacturers and the railroads if both right and lefthand types of brake parts were required to be manufactured and kept in stock since this would involve greater overhead in carrying the different types of brakes.

The object of my invention is to provide a simple form of hand operated ratchet type of brake suitable for railway cars wherein the parts are so designed that they may be assembled to permit operation of the brake either as a righthand or lefthand brake to thereby minimize cost of manufacture and obviate the necessity of carrying two different sets of parts in stock.

In the drawing forming a part of this specification, Figure 1 is a vertical sectional view of the operative part of a vertical staff type of hand brake for railway cars showing my improvements in connection therewith, the arrangement being that wherein the brake is adapted for the usual righthand operation. Fig. 2 is a horizontal sectional view corresponding substantially to the line 2—2 of Fig. 1 except that the operating handle and pawl are shown in their horizontal operative position. Fig. 3 is a vertical sectional view corresponding substantially to the line 3—3 of Fig. 1. And Fig. 4 is a view similar to Fig. 2 but illustrating the arrangement of the parts when the brake is assembled for lefthand operation.

In said drawing, 10 indicates a portion of a vertical brake staff, the upper end of which is made square or of other non-circular section as indicated at 11. Detachably associated with the squared section 11 is a ratchet wheel 12 having duplicated upper and lower journal sections 13—13 and an intermediate peripherally arranged set of ratchet teeth 14.

The lower end of the ratchet wheel 12 is supported on the lower wall 15 of a combined housing and bracket 16 which is adapted to be riveted or otherwise rigidly secured to the wall 17 of the car. Said lower wall 15 of the bracket is provided with a depending annular flange 18 recessed to form a suitable bearing for the corresponding end of the ratchet wheel 12. The bracket 16, as clearly indicated in Fig. 2, is provided with spaced laterally extended walls 19—19 which help to inclose the various parts of the ratcheting mechanism. Each of said walls 19—19 is provided with an opening 20 for the purpose hereinafter indicated. The top of the housing is formed by a plate 21 having suitable depending side walls 22—22 (see Fig. 3) which rest upon the side walls 19. The plate 21 is held in position by the bolt and nut 23.

Oscillatably mounted on the upper journal 13 provided by the ratchet wheel 12, is a carrier 24 having an annular bearing 25 formed therein as shown in Fig. 1. In addition, the carrier 24 is provided with a laterally extended pair of parallel arms 26—26 united at the tops by a curved web 27, thus forming a housing for the upper end of the operating handle or lever 28 and the pawl 29. The carrier 24 is provided with a substantially circular downwardly extending flange 30 which envelops the ratchet wheel, said flange being slotted through substantially an arc of 180° as indicated at 31 to permit oscillation thereof with respect to the locking dog, hereinafter described. With the arrangement described, consisting of the bracket 16, plate 21 and carrier 24, it is evident that the ratchet wheel and associated parts are well protected from the weather and dirt or other foreign substances.

The operating handle 28 is provided at its upper end with a longitudinally extending socket 32 of square outline and in which the pawl 29 is slidably mounted and guided, it being understood that the pawl 29 is of corresponding cross section. A spring 33 is interposed between the bottom wall of the socket 32 and the pawl 29 so as to automatically always project the pawl outward into operative position with respect to the lever 28. The pawl 29 is held in assembled relation with the handle 28 and the latter is pivotally attached to the carrier 24 by means of a common bolt 34 which is carried by the flanges 26 of the carrier and extends through suitable perforations in the handle and through the elongated slot 35 of the pawl. As will be understood by those skilled in the art, the handle 28 will drop to a depending vertical position under the influence of gravity when released by the brakeman. By elevating the same to the horizontal position indicated by the dotted lines in Fig. 1, the teeth 135 of the pawl are brought into operative relation with the teeth 14 of the ratchet wheel 12 and the rotation of the staff and winding of the brake chain is effected by swinging the handle 28 back and forth in a horizontal plane.

To prevent accidental reverse rotation of the staff 10 and consequently loosening of the brake chain, the locking dog 36, is employed, the same having a release handle 37 and a tooth 38. The dog 36 is pivotally mounted on the bolt 23 and is supported in its proper horizontal position by means of a small ledge or shelf 39 formed integrally with the bracket 16. To automatically control the position of the locking dog, a spring 40 is used, the same seating at one end over a stud 41 formed on the locking dog and over either one of two corresponding studs 42—42 formed on the bracket 16. As shown in Figs. 2 and 4, the handle 37 of the locking dog extends to the exterior of the housing through either one of the openings 20, previously mentioned.

With the parts arranged as shown in Figs. 1, 2 and 3, it is evident that the brake chain is wound up by rotating the staff 10 in a clockwise direction as viewed in Fig. 2 which is the usual direction employed in hand brakes for railway cars. When it is desired to adapt the brake mechanism for lefthand operation, the parts are disassembled and the ratchet wheel 12 turned over and then applied to the squared section of the staff which will bring the teeth 14 thereof so as to face in the opposite direction as indicated in Fig. 4. The locking dog 36 is also reversed in position so as to extend the release handle 37 through the opposite opening 20 to that through which it extends in the arrangement shown in Fig. 2. The spring 40 will be correspondingly shifted. In this connection, it will be understood that the structure of the locking dog 36 is symmetrical on either side of a horizontally extending central plane therethrough. The pawl 29 is also reversed within the handle 28 to the position shown in Fig. 4. When these parts are arranged as last described, it is evident that the brake staff 10 can be rotated in a counterclockwise or lefthand direction to effect application of the brakes.

From the preceding description considered in connection with the drawing, it is evident that a single set of parts may be manufactured and carried in stock to be used in either a righthand or lefthand operated brake. The parts are of simple construction and of no greater expense than other types of hand brakes heretofore proposed and which are operable only in one direction.

I am aware that various changes and modifications may be made in the details of construction without departing from the spirit of the invention and all such changes and modifications are contemplated that come within the scope of the claims appended hereto.

I claim:

1. In a hand brake, the combination with an element adapted to be rotated to effect tightening of the brake chain; of a ratchet wheel associated with said element and adapted to be positioned with respect thereto to have the ratchet teeth thereof face in either direction; of a pawl coöperable with said ratchet wheel, the operative position of the pawl being also reversible; a supporting bracket; and a locking dog mounted on the bracket and coöperable with the ratchet wheel, the operative position of said locking dog on the bracket being also reversible.

2. In a hand brake of the character described, the combination with a vertical brake staff adapted to be rotated to effect winding of the brake chain; of a ratchet wheel detachably associated with said staff and adapted to be non-rotatably applied thereto with the teeth facing in either direction; of a carrier oscillatably supported with respect to the ratchet wheel and staff; a gravity drop handle pivotally connected to said carrier, said handle having a pawl associated therewith arranged to have its operative position reversed with respect to the ratchet wheel; a supporting bracket; and a locking dog mounted on the bracket and coöperable with the ratchet wheel, the operative position of said locking dog on the bracket being also reversible.

3. In a hand brake of the character described, the combination with a vertical brake staff adapted to be rotated to effect winding of the brake chain; of a ratchet wheel detachably mounted on said staff and adapted to be non-rotatably secured thereto with the teeth facing in either direction; of a housing providing a journal bearing for the staff and ratchet wheel; a locking dog pivotally mounted in said housing adapted to have its operative position reversed to coöperate with the ratchet wheel in either of the latter's positions; a carrier oscillatably mounted with respect to the ratchet wheel;

an operating handle pivotally mounted on the carrier; and a pawl slidably mounted in the handle, said pawl being adapted to coöperate with the ratchet wheel and arranged to have the operative position thereof reversed with respect to the handle.

4. In a hand brake of the character described, the combination with a vertical brake staff; of a ratchet wheel detachably and non-rotatably associated with the staff, the position of said ratchet wheel being reversible with respect to the staff so as to present the ratchet teeth thereof facing in either direction; a housing; a locking dog pivotally mounted in said housing and adapted to be positioned on its pivot to operate in either a right or lefthand direction; a carrier oscillatably mounted with respect to the ratchet wheel and staff; a gravity drop handle pivotally mounted on the carrier; and a spring-controlled pawl slidably mounted in the handle, the operative position of the pawl with respect to the handle being reversible in right or lefthand oscillation.

In witness that I claim the foregoing I have hereunto subscribed my name this 17th day of June, 1920.

WILLIAM A. GEIGER.

Witnesses:
CARRY GAILING.
UNA C. GRIGSBY.